United States Patent [19] [11] 3,935,379
Thornburg et al. [45] Jan. 27, 1976

[54] METHOD OF AND SYSTEM FOR ADAPTIVE RUN LENGTH ENCODING OF IMAGE REPRESENTING DIGITAL INFORMATION

[75] Inventors: Daryl D. Thornburg; James L. Christensen, both of San Diego, Calif.

[73] Assignee: General Dynamics Corporation, St. Louis, Mo.

[22] Filed: May 9, 1974

[21] Appl. No.: 468,789

[52] U.S. Cl. ................................ 178/6; 178/DIG. 3
[51] Int. Cl.² ........................................... H04N 1/38
[58] Field of Search ........................ 178/DIG. 3, 6

[56] References Cited
UNITED STATES PATENTS

| | | | |
|---|---|---|---|
| 3,061,672 | 10/1962 | Wyle | 178/DIG. 3 |
| 3,483,317 | 12/1969 | DeGroat | 178/DIG. 3 |
| 3,502,806 | 3/1970 | Townsend | 178/DIG. 3 |
| 3,646,257 | 2/1972 | Epstein et al. | 178/DIG. 3 |
| 3,678,388 | 7/1972 | Peterson | 178/DIG. 3 |
| 3,700,797 | 10/1972 | Wernikoff | 178/DIG. 3 |
| 3,723,641 | 3/1973 | Heinrich | 178/DIG. 3 |
| 3,739,085 | 6/1973 | Rosen | 178/DIG. 3 |
| 3,748,379 | 7/1973 | Epstein et al. | 178/DIG. 3 |

*Primary Examiner*—Howard W. Britton
*Assistant Examiner*—Michael A. Masinick
*Attorney, Agent, or Firm*—Martin Lukacher

[57] ABSTRACT

The transmission requirements for digital information representing images, such as radar displays produced by radar video returns and business letters, are reduced by encoding successive sets of duplicate data in the form of N-bit words which represent the data, each suffixed by an M-bit portion of a K-bit word representing the number of duplicate N-bit words. The output words, consisting of the M and N bit portions, are generated until all non-zero portions of the K-bit words are accounted for. The number of output words adapt to the run length of duplicate data words and provide for data compression; thus reducing transmission bandwidth requirements.

15 Claims, 4 Drawing Figures

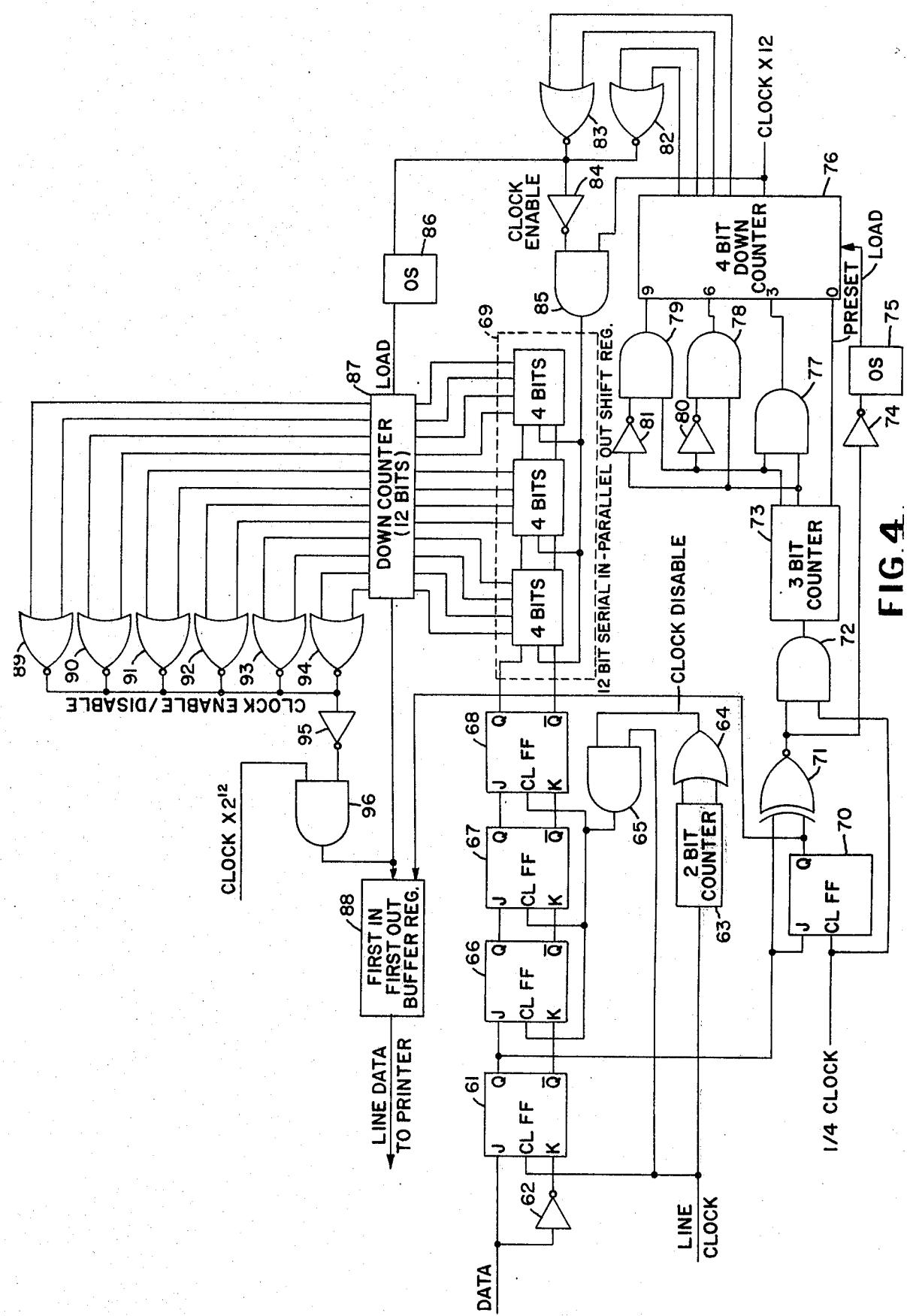

METHOD OF AND SYSTEM FOR ADAPTIVE RUN LENGTH ENCODING OF IMAGE REPRESENTING DIGITAL INFORMATION

The present invention relates to digital data encoding systems and particularly to an adaptive run length encoding system for reducing the transmission requirements for data resulting from image signals.

The invention is especially suitable for use in reducing the transmission bandwidth of radar information such as moving target indicator (MTI) radar returns, weather radar data and business letters. The invention however, is also applicable for use in connection with any digital sensor for encoding uniquely the number of consecutive digital words produced by such sensors so as to compress sensor data and reduce the bandwidth and/or transmission time requirements thereof.

A principal feature of this invention is to provide an improved run length encoding technique. In ordinary run length encoding systems data is encoded for each run of duplicative data into a number representing the length of the run together with a code representing the value of the signal at the beginning of the run. Thus, instead of providing a different word for each signal element (viz., each picture element or pixel) only a pixel word and the number of pixels, which are identical thereto until the pixel changes (viz., the tone or light value of the picture element to which it corresponds) are transmitted. Such systems have been found to provide a reasonable amount of data compression. Reference may be had to the following United States patents for further information respecting known run length encoding techniques: U.S. Pat. Nos. 2,909,601; 2,922,840; 2,963,551; 2,978,535; 3,185,823; 3,185,824; 3,213,268; 3,344,231; 3,378,641; 3,502,806; 3,560,639; 3,584,145; 3,588,364; and 3,711,650.

In spite of the effectiveness of run length encoding to compress data and to improve the effectiveness of utilization of a transmission link such as a radio channel or telephone line, such techniques often have not been used because of the complexity of the encoding and decoding circuitry which has been required. It has been found in accordance with the invention that run length encoding may be carried out with no loss of input information when the runs are encoded into one or more words each of equal length (viz., the same number of bits). The number of such words is adaptive to the length of the run; more words being provided for longer runs. Equal length words may be provided in accordance with the invention by circuitry which is readily implemented at low cost. Similarly the circuitry for decoding the equal run length words may also be implemented at low cost. The information density of the encoded output data is increased as in conventional run length encoding, without increasing error rates, and yet in a manner to facilitate the implementation of the encoding and decoding circuitry. By information density is meant the average amount of usable information per bit of data. Compressed data therefore has higher information density than data which is not compressed, as through the use of a run length encoding technique as provided by the present invention.

Accordingly, it is an object of the present invention to provide an improved method of and system for run length data encoding which reduces data transmission requirements.

It is a further object of the invention to provide an improved data compression system which is adaptive in response to changes in the data to provide words which are of equal length, but are more numerous for longer distances between changes in data than for shorter distances between such changes.

It is a still further object of the present invention to provide an improved method of and system for run length encoding where runs duplicative of data are encoded into segments of equal length each of which represents the data and a different portion of the lengths over which the data is duplicative.

It is a still further object of the present invention to provide an improved system for and method of pulse code modulation for image signals which reduce the transmission requirements for such signals by reducing the number of bits required to transmit such signals over a transmission link.

It is a still further and perhaps a most advantageous object of the present invention to provide an improved run length encoding system which can be implemented simply and at low cost.

It is a still further object of the present invention to provide an improved system for and method of encoding digital data representing image or picture elements by means of which the information density of the data is increased.

Briefly described, the invention involves the comparison of consecutive digital signals which represents consecutive elements of the image to be encoded. The number of consecutive elements is counted until a change in the data is detected. Upon occurrence of a data change, the number of consecutive signals which have previously been counted is translated into one or more digital words of equal length, each word including bits representing the signal before the data change and bits of successively higher order portions of a number representing the count of identical consecutive signals. Only so many words are generated as to account for all non-zero portions of the count. The number of words generated is therefore adaptive to the length of duplicative data. Nevertheless the words have the same number of bits and can be encoded and decoded with digital circuitry which may be readily implemented.

The foregoing and other objects, features and advantages of the present invention will become more readily apparent from a reading of the following description in connection with the accompanying drawings in which:

FIG. 4 is a block diagram of a system for decoding the data encoded by a system of the type shown in FIG. 3.

Figure 1:
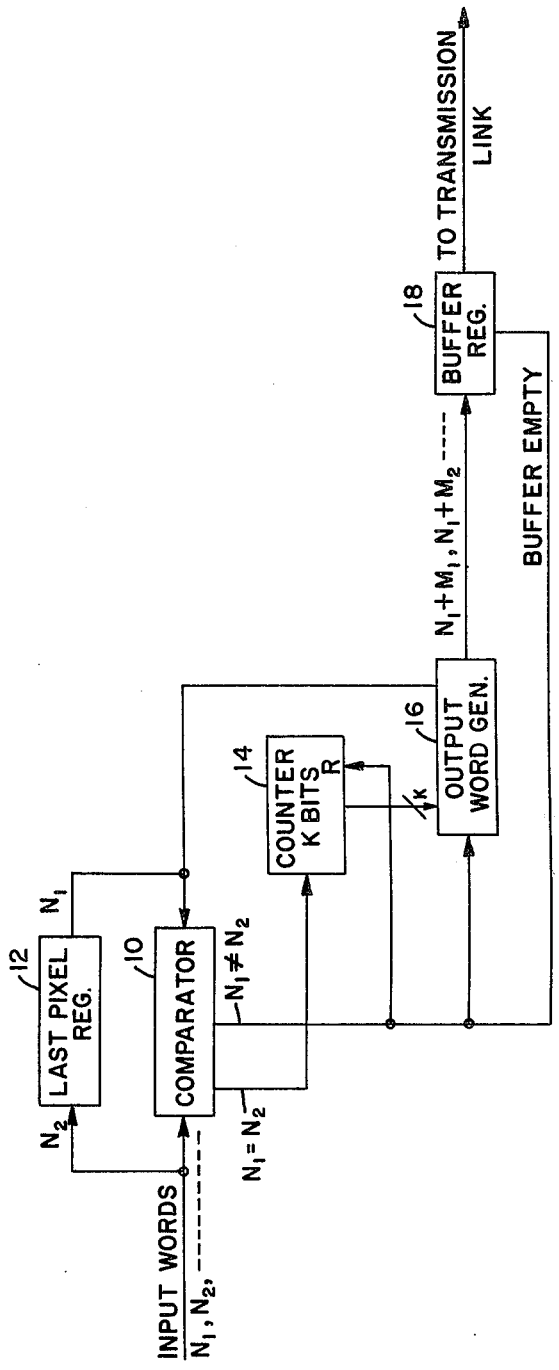
FIG. 1 is a functional block diagram illustrating an encoding system embodying the invention.

Referring to FIG. 1, the encoder system shown therein consists of a comparator 10, a last pixel register 12, a K-bit counter 14, an output word generator 16 and a buffer register 18. Input words are obtained from a digital sensor which may be the sensor of a facsimile machine which scans business letters or other images, such as finger print cards and which are digitized into digital words containing one or more bits. The number of bits in these words are indicated generally as N; the words occurring consecutively, $N_1$ followed by $N_2$ followed by $N_3$ and so forth. The input word may also be derived by digitizing the video signals such as radar returns, particularly MTI or weather radar returns. Such digital sensors may be sampling circuits, threshold gates or analog to digital converters, which, since they are known in the art and are described in some of the patents referenced above, are not discussed in detail herein.

Each of the words is derived from a successive image element as may be located consecutively along a line extending across the image; the image being scanned after a raster of these lines is traversed in accordance with conventional facsimile techniques. Accordingly the words are referred to as pixel or picture element words. The first of a pair of consecutive pixel words, $N_1$, is stored in and appears at the output of the last pixel register 12 while the next pixel word $N_2$ appears at the input of the register 12. The words of each consecutive pair are then applied at the inputs of the comparator 10 to provide the first output when the words are the same (viz., $N_1$ equals $N_2$) and a second output when there is a change in the input data (viz., $N_1$ is not equal to $N_2$). The comparator may for example be an integrated circuit of the type which is available and provides outputs when the pair of words applied thereto are the same and other outputs when they are not the same (viz., one word has a value greater than or less than the other). Each time the words are the same, the first output is applied to the counter 14 advancing it one count. The counter has the capacity to store K-bits where K is equal to or greater than the number of picture elements per line. Accordingly, the number which is stored in the counter 14 represents the length of the run of consecutive words (viz., duplicative data) in the input word stream.

When a change in data occurs the second output provides a transfer pulse which transfers the counter word, which of course has K-bits, to the output word generator 16 and resets the counter 14. The output word generator 16 includes digital logic for producing output words each containing the word corresponding to the input words which existed before the data changed (e.g., $N_1$) plus a different portion of the counter word. The counter word has several portions each having M-bits. The bits of the lower order portion of the counter word are indicated as $M_1$ and of the successively higher order portions of the counter word $M_2$, $M_3$ and so forth. These words are transferred to the buffer register 18 because the output bit rate of the word generator is time varying while the transmission link should desirably receive the bits at a fixed rate. The buffer register 18 therefore provides storage for the output words until they can be transmitted. If the buffer becomes empty, a buffer empty signal is applied to the line which carries the second output and operates the encoder as if there was a data change. In other words, data change occurs whenever there is a change in the shade of grey. In most instances, as where business letters are being encoded there are only two shades of grey, black and white, and the input words need only have one bit. For other data such as radar returns the input words may have several bits; e.g., eight bits. Output words are therefore generated asynchronously each time there is a change in the shade of grey. Line sync words and frame sync words may also be added in the buffer register 18 by conventional multiplexing logic, not shown.

Figure 2:
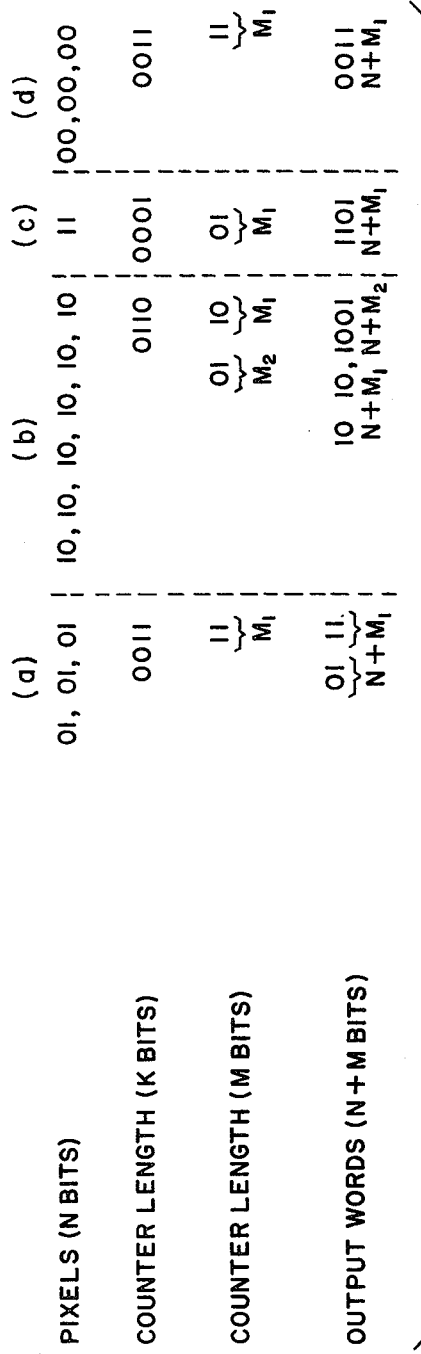
FIG. 2 is a table which illustrates the encoding method provided by the invention and the operation of the system shown in FIG. 1.

The chart in FIG. 2 illustrates the case where the pixels are two bit words, N = 2; the counter length is 4 bits (K = 4); the counter portion or segment length is 2 bits (M = 2) and the output words are 4 bits in length (N + M = 4). Four runs are shown. In run (a) there are three consecutive words consisting of the bits 01 before a change to a 10 bit in the next run (b) occurs. Three output pulses are then counted in the counter 14 and the counter word represents the number three in binary form. When the counter word changes, the word generator generates an output word 01 suffixing, an M-bit, in this case two bit, portion of the counter word. This M-bit portion is indicated as $M_1$ and consists of the two lowest order bits of the counter word. Output words corresponding to the zero bit portions of the counter word need not be transmitted and only one output word $N + M_1$ is therefore transmitted for the first run.

The second run (b) contains 6 ten words. The counter then stores a binary number corresponding to decimal six and there are two non-zero M-bit portions of the counter word indicated as $M_1$ for the lower order bits and $M_2$ for the higher order bits. In this example two output words are transmitted, the first being $N + M_1$ and the second $N + M_2$.

The next run consists only of a single word containing the bits 11. The counter word represents decimal one in binary form. Only the first or $M_1$ 2-bit segment of the counter word is considered and the output word consists of the pixel word N which is binary 11 followed by the $M_1$ bits 01.

The next run consists of three 00 pixel words. The operation is similar to that described in run (a) and only one output word consisting of binary 00 suffixed by binary 11 is provided. It will therefore be seen that output words of equal bit lengths are generated and the number of output words is adaptive to run lengths.

Figure 3:
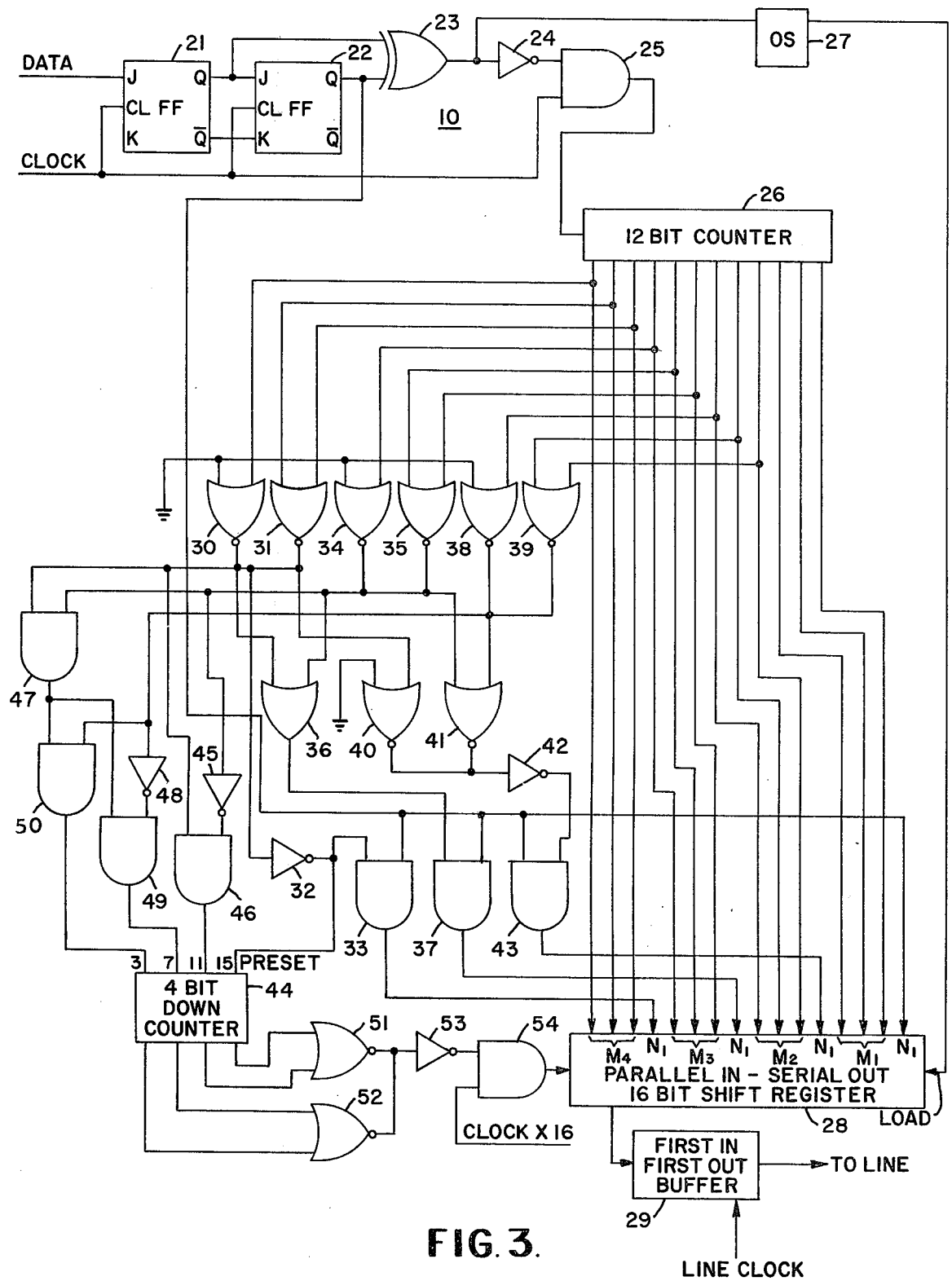
FIG. 3 is a more detailed block diagram of an encoding system of the type generally illustrated in FIG. 1.

FIG. 3 illustrates an encoding system where N is one bit, K is twelve bits, and M is three bits. The comparator 10 is provided by a JK flip-flop 21, an exclusive OR gate 23 an AND gate 25, and an inverter input 24. The last pixel register 12 is provided by a flip-flop 22. The image signal level, which may either be high or low depicting the two shades of grey, is applied to the J input of the flip-flop 21 and clocked in by clock pulses. The next clock pulse transfers the first signal word $N_1$ to the register flip-flop 22. Consecutive pairs of signal words ($N_1$ and $N_2$, $N_2$ and $N_3$, $N_3$ and $N_4$, et seq.) are applied to the exclusive OR gate 23.

When consecutive words are the same the inverter 24 allows the clock to be passed through the AND gate 25 and increment a twelve bit counter 26. When consecutive words are different the output of the exclusive OR gate 23 triggers a ONE-SHOT multivibrator 27 which generates a load pulse to enable loading the accumulated counter word into a sixteen bit shift register 28.

The register word is shifted out of the shift register 28 by a clock with frequency higher, say sixteen times the frequency of the clock which drives the flip-flop 21 or the line clock which reads out a line buffer register 29. The number of bits shifted into the line buffer 29 is determined by the encoding circuitry shown in FIG. 3. The three most significant bits of the counter 26 are combined in NOR gates 30 and 31, and their output is applied via an inverter 32 to an AND gate 33. If any of the three most significant bits of the counter 26 are non-zero, then the data word from the flip-flop 22 is passed through the AND gate 33 into the 16 bit shift register 28. The next three significant bits in the counter 26 are combined in NOR gates 34 and 35. The output of these gates 34 and 35 is combined with the output from the gates 30 and 31 in an OR gate 36. If any of the six most significant bits in the counter 26 is non-zero, the data from the flip-flop 22 is allowed to pass through the AND gate 37 into the 16 bit shift register 28. The next three significant bits in the counter 26 are similarly combined in NOR gates 38 and 39. If any of the nine most significant bits in the counter 26 is non-zero, the output of the NOR gates 40 and 41 will be low, causing the output of an inverter 42 to be high. This output allows the data from the flip-flop 22 to be passed through an AND gate 43 and into the shift register 28.

If any of the three most significant bits in the counter 26 is non-zero, the output of the inverter 32 will be high, causing a 4-bit (i.e., divide by 16) counter 44 to be preset to 15. If any of the next three significant bits in the counter 26 is non-zero, the input to an inverter 45 will be low. Then the output of an AND gate 46 is high and the counter 44 is preset to eleven. The next three significant bits in the counter 26 are similarly encoded in the gates 47, 48 and 49. If any of these bits is non-zero and all of the six more significant counter bits are zero, the counter 44 is preset to seven. If only the three least significant bits contain a non-zero entry, the output of an AND gate 50 is high and the counter 44 is preset to three. NOR gates 51 and 52 combine the bits in the counter 44 to drive an inverter 53. If any of the bits in the counter 44 is non-zero, the output of the inverter 53 is high; thus allowing the high frequency clock to be passed through an AND gate 54. Accordingly the number of output words ($N_1 + M_1$, $N_1 + M_2$, $N_1 + M_3$, $N_1 + M_4$) depends upon the length of the run (viz., the counter 26 word).

Decoding may be accomplished by means of the system shown in FIG. 4. Data, which has been encoded as by the system shown in FIG. 3, is applied to the J input of a flip-flop 61 and also to the K input thereof through an inverter 62. The flip-flop 61 is driven by the line clock. The two outputs of a two bit counter 63 are combined in an OR gate 64 to disable the line clock from passing through an AND gate 65 every fourth pulse from the line clock. This causes the clock driving three tandem connected flip-flops 66, 67 and 68 to be disabled every fourth line clock pulse and allows only the bits which are derived from the counter 26 of FIG. 3 to be passed to a 12 bit shift register 69.

Every fourth bit is a level word, N, which represents one or more pixel words depending upon the run length of pixel words of the same shade of grey level, and is passed through a flip-flop 70 by a clock with frequency equal to one-fourth the line clock frequency. Successive level words (each fourth bit) are compared in the exclusive NOR gate 71. When the level words are the same the ¼ clock is allowed to pass through an AND gate 72 and increments a three bit counter 73. When successive level words are different the output of an inverter 74 is high, and a ONE-SHOT 75 is triggered to load a four bit counter 76.

The counter 76 is preset to either zero, three, six or nine by decoding the count stored in the counter 73. AND gates 77, 78, and 79 and inverters 80 and 81 provide the decoder. The counter 76 is driven by a clock with frequency twelve times higher than the line clock frequency. Thus, the counter 76 is preset to nine, when only one level word of the same value is received by the flip-flop 61 (viz., $N_1$, $N_2$ is 10 or 01). The bits in the shift register 69 are then shifted to the right 9 times. If two successive level words are the same (viz., $N_1$, $N_2$ is 00 or 11) the counter 76 is preset to six and the bits in shift register 69 are shifted to the right six times and so forth for three and four successive level words. The clock controlling the shift register is decoded by NOR gates 82 and 83, an inverter 84 and an AND gate 85.

When the counter 76 has counted down to zero, the output of the gates 82 and 83 passes and triggers a ONE-SHOT 86 which applies a load pulse to a twelve bit counter 87. This counter 87 is counted down by a clock with frequency $2^{12}$ times the frequency of the line clock. This clock also enables loading of level word data from the flip-flop 70 into a first-in first-out buffer register 88. The $2^{12}$ clock is controlled by combining the bits of the twelve bit counter 87 in NOR gates 89–94 and applying clock, enable/disable levels through an inverter 95 and an AND gate 96. Accordingly, the consecutive N words which are represented by their suffixing M bit portions will be provided as output data for a printer or display. If analog line data is required an integrator, which for the single bit data word case operates as a digital to analog converter, may be used to provide an image signal level for the display.

From the foregoing description it will be apparent that there has been provided an improved method of and system for run length encoding which increases the information density of digital signals which transmit image information. While preferred embodiments of the system and method have been described herein, it will be appreciated that variations and modifications of the hereindescribed method and systems will undoubtedly suggest themselves to those skilled in the art. Accordingly, the foregoing description should be taken as merely illustrative and not in any limiting sense.

What is claimed is:

1. The method of increasing the information density of digital data which represents an image, comprising the steps of:
   a. comparing consecutive pairs of digital signals which represent different pixels of said image,
   b. counting the number of said consecutive pairs, each of the signals of which are identical, and
   c. upon occurrence of each of said consecutive pairs which is constructed of signals which are different, encoding the number which is counted before said occurrence into
      i. a first digital data word having a given number of digits representing the first signal of the consecutive pair which is constituted of different signals and a portion of said counted number which is actually a part thereof, and
      ii. into additional digital words for any remaining portions of said last named number which are also actually parts thereof and which are greater than zero, which additional words each having said given number of digits and representing said first signal and different ones of said remaining portions.

2. The invention as set forth in claim 1, wherein said number is counted in binary digits and said digital signals are also binary digits, and wherein said encoding step includes separating said counted number into said portions each of which is constituted of a plurality of said digits which is of consecutively higher order, and arranging said plurality of said digits of lowest order and said binary digits of said first signal to provide said first digital word and said first signal and each said pluralities of digits of consecutively higher order and said first signal digits to provide said additional digital words.

3. The invention as set forth in claim 2, wherein said counted number has K binary digits, said digital signal has N binary digits and said portions each have M binary digits, and wherein said encoding step includes arranging said digital word with said M digit portions suffixing said N digits portions.

4. The invention as set forth in claim 3, further comprising storing said digital words in order of corresponding to the order of the M digit portions, and reading out only the one of said stored digital words of highest order which has an M digit portion at least one of the digits of which is a binary "1" and the digital words of lower order thereto.

5. A system for encoding digital signals representing consecutive elements of an image, which system comprises means for comparing different pairs of said signals which represent said consecutive elements to provide first outputs when said signals in each pair are the same and second outputs when said signals are different, means for counting said first outputs and responsive to said second outputs for providing a count number having a plurality of binary digits, said number being equal to the number of said first outputs preceding said second outputs, and means operative upon occurrence of said second outputs for generating output words, each of which have a like number of digits and each consisting of the digits of a first of said signals in said pair which provides said second outputs and a group of the digits of said number which are actual parts thereof, each of said groups including a plurality of successively higher order digits of said number, the last of which groups includes a digit which represents a binary "1".

6. The invention as set forth in claim 5 wherein said element signals are binary digits having N bits, said counting means includes a counter having storage for K bits and wherein each of said groups has M bits, where K is greater than M.

7. The invention as set forth in claim 5 wherein said counting means is a counter having capacity to count to a total number at least equal to the number of elements of which a line of said image is constituted.

8. The invention as set forth in claim 7 wherein said word generating means includes a register having capacity to store the bits of said total number and a plurality of additional bits, means responsive to said second outputs for transferring to said register said digits of said counter number and the digits of said first signal number with said first signal digits interleaved between different ones of said groups of counter digits, and means for reading out said register.

9. The invention as set forth in claim 7 wherein said word generating means includes a register, and said comparing means includes means for storing said first signal digits, means operated by said second output for transferring the bits of said counter number into said register, and logic means for transferring the highest order bit group of said number in said counter, which contains a binary "1" bit, and each of said bit groups of lower order into said register, said logic means also including means for transferring said first signal digits to said register in positions suffixing each of said bit groups which is transferred to said register.

10. The invention as set forth in claim 9 wherein said register is a shift register and further comprising logic means responsive to the bits of the number in said counter for enabling a number of shift pulses equal to the number of bits transferred to said register to be applied to said register.

11. The invention as set forth in claim 10 further comprising an output buffer register connected to the output of said register.

12. The invention as set forth in claim 5 including a system for decoding said output words, which decoding system comprises means for comparing signals representing the first digits of successive ones of said output words to provide third outputs when said first digit signals in each of said successive words are the same and fourth outputs when said first digit signals are different, means for counting said third outputs and responsive to said output words for providing a count number having a plurality of binary digits, said number being equal to the number of said first outputs preceding said second outputs, and means operated by said count number and said first digit representing signals for generating output data words, each consisting of a succession of said first digit signals equal in number to said count number.

13. The invention as set forth in claim 12 wherein said counting means comprises a down counter having capacity to count to a total number at least equal to the number of elements of a line of said image, and means responsive to said output words for presetting said down counter to a number corresponding to the number represented by successive groups of digits of said output words suffixed by said first digits which are the same.

14. The invention as set forth in claim 13 wherein said presetting means includes a second register having capacity to store the bits of said total number, and means responsive to said third outputs for transferring the digits of output words to said second register.

15. The invention as set forth in claim 14 wherein said third output responsive transferring means includes counter means for counting said third outputs, means operated by said counter means for transferring the bits of said output words into said second register, and logic means responsive to said fourth output for transferring the contents of said second register to said down counter for presetting said down counter.

* * * * *